United States Patent [19]
Buehler et al.

[11] Patent Number: 4,471,065
[45] Date of Patent: Sep. 11, 1984

[54] OLEFIN POLYMERIZATION CATALYST ACTIVITY BY OLEFIN WASHING

[75] Inventors: Charles K. Buehler, Naperville; Richard W. Fries, Joliet, both of Ill.

[73] Assignee: Northern Petrochemical Company, Omaha, Nebr.

[21] Appl. No.: 530,533

[22] Filed: Sep. 9, 1983

[51] Int. Cl.$^3$ ............................................... C08F 4/64
[52] U.S. Cl. ................... 502/108; 502/127; 526/142
[58] Field of Search ................................ 502/108, 127

[56] References Cited

U.S. PATENT DOCUMENTS

| T951,009 | 10/1976 | Jaggard | 502/105 X |
|---|---|---|---|
| 3,046,266 | 7/1962 | Benning et al. | 502/169 X |
| 3,062,801 | 11/1962 | Hoeg et al. | 502/108 X |
| 3,067,183 | 12/1962 | Hagemeyer et al. | 502/108 X |
| 3,239,497 | 3/1966 | Machida et al. | 502/108 X |
| 3,404,096 | 10/1968 | Lamborn | 502/108 |
| 4,008,177 | 2/1977 | Rust et al. | 502/108 X |
| 4,048,415 | 9/1977 | Matsuzawa et al. | 502/127 X |
| 4,242,480 | 12/1980 | Welch | 502/127 X |
| 4,312,784 | 1/1982 | Welch et al. | 502/127 X |
| 4,343,721 | 8/1982 | Goodall et al. | 502/127 X |

FOREIGN PATENT DOCUMENTS 733718  5/1980  U.S.S.R. .............................. 502/108

Primary Examiner—Patrick Garvin
Attorney, Agent, or Firm—Donald F. Haas

[57] ABSTRACT

A method is disclosed for increasing the productivity of an olefin polymerization catalyst. The catalyst contains an aluminum chloride co-crystallized titanium halide modified with an electron donor containing an ester group. The catalyst component is washed with an olefin, thereby greatly increasing its productivity without significantly adversely affecting the crystallinity of the polymer produced.

7 Claims, No Drawings

4,471,065

OLEFIN POLYMERIZATION CATALYST ACTIVITY BY OLEFIN WASHING

BACKGROUND OF THE INVENTION

This invention relates to a method for increasing the productivity of olefin polymerization catalysts and to the production of such a catalyst which exhibits better productivity and produces a polymer with acceptable stereospecificity. More particularly, the invention relates to a method for washing an aluminum chloride co-crystallized titanium halide, which has been modified with an electron donor containing an ester group, with an olefin to increase the productivity of the catalyst.

U.S. Pat. No. 4,048,415, issued Sept. 13, 1977, discloses an improved process for the polymerization of olefins with a catalyst which has a titanium trichloride component prepared by reduction of titanium tetrachloride with hydrogen, silicon, metallic titanium or metallic aluminum, a complex of aluminum chloride with an electron donor, and a polysiloxane, and extracting the complex from the catalyst with a saturated hydrocarbon. We have found that better catalyst productivity can be obtained without sacrificing stereospecificity if the catalyst is washed with an olefin rather than a saturated hydrocarbon.

U.S. Pat. No. 3,404,096, issued Oct. 1, 1968, discloses a method for improving a titanium trichloride catalyst by pretreating the catalyst in an inert diluent in the absence of an activator with an olefin having 2 to 6 carbon atoms for a minimum of about 10 minutes. It is said that the catalyst undergoes a physical change whereby it agglomerates into curds and appears to swell. Defensive Publication T951,009, published Oct. 5, 1976, discloses an olefin polymerization catalyst which comprises titanium trichloride ground together with octamethylphyrophosphoramide wherein the two components are ground together in a ball mill and then contacted with proplyene for a time sufficient for from 0.1 up to 5.0 moles of propylene to be taken up by the titanium compound. Both of the above catalysts are different from the catalyst of the present invention in that they do not contain an electron donor modifier with an ester group and they both appear to react with the olefine such that material is added to the catalyst. We have found that our process provides a catalyst with better activity than the above processes and that the catalyst loses unwanted material as a result of the washing process.

SUMMARY OF THE INVENTION

The present invention is a method for increasing the productivity of an olefin polymerization catalyst containing an aluminum chloride co-crystallized titanium halide modified with an electron donor containing an ester group which comprises washing the modified titanium halide with an olefin. In a preferred embodiment of the invention, the electron donor is an organic acid ester such as a benzonic acid ester, ethyl phenyl acetate, or a halogenated carboxylic acid ester. It is preferred that the olefin washing take place for a period of at least about one minute.

DETAILED DESCRIPTION OF THE INVENTION

The catalyst produced by the process of the present invention can be used to polymerize or copolymerize one or more alpha olefin monomers such as ethylene, propylene, 1-butene, 3-methyl-1-butene, 1-pentene, 4-methyl-1-pentene, 1-hexene, styrene, 1-octene, dodecene, and tetradecene. The catalyst comprises an aluminum chloride co-crystallized titanium halide which has been modified with an electron donor containing a carbon-oxygen bond.

Titanium halide co-crystals which are particularly suitable are obtained by co-crystallizing titanium trichloride with aluminum trichloride. Co-crystals of the formula $TiCl_3.1/3AlCl_3$ are particularly suitable. Titanium trichloride can be obtained by reducing titanium tetrachloride with hydrogen, aluminum or an aluminum-organic compound. The appropriate titanium halides are commercially available and hence do not require further comment.

The electron donor can be selected from a wide variety of organic compounds which have an ester group. These include, but are not limited to, alkyl esters of aliphatic monocarboxylic acids, alkyl esters of aromatic monocarboxylic acids, and alkyl esters of other saturated and unsaturated aliphatic and aromatic acids. Particularly preferred for use in the present invention are the alkyl esters of organic acids, especially monocarboxylic acid esters such as benzoic acid esters including ethyl, butyl, and benzyl benzoate, ethyl phenyl acetate, and halogenated carboxylic acid esters such as ethyl 4-chlorobutylate. The most highly preferred electron donors for use in the present invention are butyl benzoate and ethyl phenyl acetate because of the ease of ball milling and product handling.

The olefin which is used in the wash procedure of the present invention may be any primary or secondary olefin which is not a solid at the washing temperature, and if a gas, is soluble in normal hydrocarbons. Ethylene, propylene, 1-butene, 3-methyl-1-butene, 1-pentene, 4-methyl-1-pentene, 1-hexene, styrene, allyl benzene, dimethyl butene, dodecene, tetradecene, mixtures of dodecene and tetradecene, and cyclohexene can all be used to advantage in the present invention.

It is necessary that the olefin come into contact with the catalyst component in a liquid medium. The olefin itself can be used in pure liquid form or the olefin can be dissolved in a solvent such as heptane. In the latter case, the catalyst component would then be washed with the olefin-solvent solution. It is preferable that the washing take place for a period of at least about one minute because it appears that complexes of electron donor-aluminum chloride and aluninum chloride-olefin are formed and one minute of contact promotes such formation. The temperature may be from about 0° C. to about 100° C. because the extraction of these complexes is facilitated at elevated temperature. The washing procedure can be performed once or can be repeated several times. It is observed that no more than one washing is normally necessary to achieve the advantages of the present invention.

It is theorized that the improvement in catalyst productivity is achieved by the method of the present invention because the olefin washing removes aluminum trichloride or complexes of aluminum trichloride with the electron donor or the olefin from the titanium halide component. This is throught to increase the productivity because the aluminum trichloride has a negative effect thereon because its presence can take the chlorine:aluminum ratio out of the acceptable range. It appears that by removing aluminum trichloride, some of the cationic reactions which cause the formation of oligomers are eliminated.

After the titanium halide component has been washed according to the present invention, it then can be used as a polymerization catalyst by activating it with an activator such as an aluminum alkyl. Suitable aluminum alkyls are those of the formula

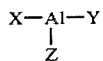

where X and Y are each alkyl of not more than 8, especially not more than 2, carbon atoms, and Z is halogen or alkyl of not more than 8, especially not more than 2, carbon atoms. These are so well known from the literature and from industrial practice that they do not require more detailed discussions here. Particularly important examples are triethylaluminum and diethylaluminum chloride.

EXAMPLE I

The catalyst used for the following experiments was a co-crystallized titanium trichloride catalyst modified with butyl benzoate by extensive ball milling. The catalyst was divided into six portions which were washed with the washing agent indicated in Table 1. The washing was carried out by placing 0.3 grams of the modified titanium halide in two milliliters of the washing agent for the period specified in Table 1 and then centrifuging the catalyst, washing it with heptane, and then recentrifuging it. The washing was carried out at atmospheric temperature and pressure in an inert atmosphere.

All of the polymerizations were carried out in a gas phase reactor at seven atmospheres of propylene for 1 hour at 70°–90° C. Diethylaluminum chloride was used at a 7:1 aluminum-titanium ratio for catalyst activation.

TABLE 1

| Catalyst | Washing Agent | Time | Productivity (gms. pp/gms. TiCl$_3$-hrs.-atmospheres) | % Heptane Insolubles |
|---|---|---|---|---|
| Control | None | — | 33.7 | 97.8 |
| No. 1 | Heptane (5 ml) | 7 days | 42.7 | 98.4 |
| No. 2 | Allyl-benzene | 20 hours | 50.9 | 95.5 |
| No. 3 | 3,3-di-methyl-butene | 6 days | 44.9 | 97.3 |
| No. 4 | Dodecene and tetra-decene solution | 7 days | 44.9 | 96.2 |
| No. 5 | 4-methyl-1-pentene | 6 days | 62.1 | 97.1 |

It can be seen from the results specified in the above Table that washing the catalyst with an olefin substantially increased the productivity of the catalyst compared to the control. The results also show that washing the catalyst with an olefin provides greater productivity than does washing the catalyst with a saturated hydrocarbon such as heptane.

EXAMPLE II

In the following experiments, a catalyst component similar to that used in Example I was divided into several samples and washed according to the following procedures. For the gaseous olefins (Nos. 1, 2 and 3), 13.2 grams of the catalyst was placed in 200 milliliters of heptane ad flushed with propylene at a rate of 50 liters per hour as the mixture was heated to 70° C. for 2 hours. The catalyst was washed two times with 100 milliliters of heptane and then dried. For No. 4, 15 grams of the catalyst was treated with a solution of 10 milliliters of a 65% dodecene-35% tetradecene mixture in 100 milliliters of heptane for 2 hours at 70° C. The catalyst was washed with heptane and then dried. All of the catalyst samples were used to polymerize propylene with diethyl aluminum chloride at a 7:1 Aluminum/TiCl$_3$ mole ratio at 7 atmospheres propylene pressure for 1 hour at 80° C.

TABLE 2

| Catalyst | Washing Agent | Productivity (gms. pp/gms. catalysts-hrs.-atmospheres) | % Heptane Insolubles |
|---|---|---|---|
| Control | None | 22.8 | 95.6 |
| No. 1 | 1-butene in heptane | 27.8 | 97.5 |
| No. 2 | propylene in heptane | 38.7 | 95.9 |
| No. 3 | ethylene in heptane | 28.6 | 96.1 |
| No. 4 | dodecene and tetradecene in heptane | 33.4 | 95.9 |

It can be seen from the above that washing the catalyst component with an olefin substantially improves the productivity of the catalyst without adversely affecting the percent of heptane insolubles in the final product.

EXAMPLE III

The experiments for this example were performed with a catalyst which was made in a manner similar to that used to make the catalyst of the previous examples except that the modifier was ethyl phenyl acetate. 0.3 grams of the catalyst was washed with 1.5 milliliters of allyl benzene for 4 hours and then centrifuged. For the polymerization of propylene, a 7:1 diethylaluminum chloride/titanium halide mole ratio was used and the polymerization was carried out at 7 atmospheres propylene pressure for 1 hour at 80° C. The results are shown below.

TABLE 3

| Catalyst | Washing Agent | Productivity (gms. pp/gms. TiCl$_3$-hrs.-atmospheres) | % Heptane Insolubles |
|---|---|---|---|
| Control | None | 40.6 | 95.7 |
| No. 1 | Allyl Benzene | 61.3 | 95.5 |

It can be seen that washing the ethyl phenyl acetate modified catalyst with allyl benzene increased the productivity by 50% while the percent heptane insolubles remained about the same.

EXAMPLE IV

The following experiments were performed on a butyl benzoate modified catalyst at a 7:1 diethylaluminum chloride/titanium trichloride ratio for 1 hour at 80° C. under 7 atmospheres propylene pressure. The washing procedure was the same as in Example I. The results are set out in the following table.

TABLE 4

| Catalyst | Washing Agent | Time | Productivity (gms. pp/gms. catalysts-hrs.-atmospheres) | % Heptane Insolubles |
|---|---|---|---|---|
| Control | None | — | 21.6 | 97.8 |
| No. 1 | Heptane | 7 days | 26.8 | 98.4 |
| No. 2 | 4-methyl-1-pentene | 6 days | 39.0 | 97.1 |

It can be seen from the above that washing the catalyst with the olefin, 4-methyl-1-pentene, significantly increases the productivity of the catalyst from the unwashed state and also is much superior to washing the catalyst with the saturated hydrocarbon heptane. The crystallinity of the polymer produced remains high.

EXAMPLE V

The following experiments were performed on a butyl benzoate modified catalyst at a 7:1 diethylaluminum chloride/titanium trichloride ratio for 1 hour at 80° C. under 7 atmospheres propylene pressure. The washing procedures were the same as in Example II. The results are set out in the following table.

TABLE 5

| Catalyst | Washing Agent | Productivity (gms. pp/gms. catalysts-hrs.-atmospheres) | % Heptane Insolubles |
|---|---|---|---|
| Control | | 22.8 | 95.8 |
| No. 1 | Propylene in heptane | 38.7 | 95.9 |
| No. 2 | Dodecene and tetradecene in heptane | 33.4 | 95.9 |

Obviously, washing the catalyst with an olefin increases the productivity without significantly affecting the crystallinity of the polymer.

EXAMPLE VI

Butyl benzoate was utilized as the modifier for this catalyst and an additional component, IRGANOX 1076®, was also used. 0.5 grams of the catalyst and 10 milliliters of the appropriate olefin are mixed together in a test tube. The color of the catalyst turns to a deeper purple immediately. The materials are allowed to react 16 to 20 hours or over night. They are occasionally mixed. After that time period, the olefin is withdrawn with a syringe. The solid catalyst is then washed with 10 milliliters of heptane. The washing and syringing is repeated two more times. The catalyst is then dried and stored for later use in polymerization. The ratio of diethylaluminum chloride/titanium trichloride/IRGANOX 1076® is 7.0/1.0/0.5. The polymerization of propylene is carried out for 2 hours at 87° C. and 435 psig.

TABLE 6

| Catalyst | Washing Agent | Time | g PP/g TiCl₃ | % Heptane Insolubles |
|---|---|---|---|---|
| No. 1 | None | — | 3707 | 98.3 |
| No. 2 | None | — | 3347 | 98.0 |
| No. 3 | 4-methyl-1-pentene | 16-20 hours | 3950 | 96.2 |

It can be seen from the above, that washing the catalyst with the olefin 4-methyl-1-pentene increases the productivity of the catalyst while maintaining acceptable crystallinity in the polymer.

EXAMPLE VII

Butyl benzoate was utilized as the modifier for this catalyst and an additional component, IRGANOX 1076®, was also used. The ratio of diethylaluminum chloride/titanium trichloride/IRGANOX 1076® was 7.0/1.0/0.5. The polymerization of propylene was carried out for 2 hours at 87° C. and 435 psig. The washing procedure was the same as in Example VI.

TABLE 7

| Catalyst | Washing Agent | Time | g PP/g TiCl₃ | % Heptane Insolubles |
|---|---|---|---|---|
| No. 1 | None | — | 3707 | 97.8 |
| No. 2 | 4-methyl-1-pentene | 16-20 hours | 5388 | 96.3 |
| No. 3 | 1-hexene | 16-20 hours | 5240 | 96.3 |
| No. 4 | 1-hexene | 16-20 hours | 5500 | 96.4 |

Table 7 also indicates that washing the catalyst with an olefin increases the yield of polymer per gram of titanium without greatly affecting the crystallinity of the polymer.

EXAMPLE VIII

The catalyst from Example VII was used to polymerize propylene for 3 hours at 190° F. and 435 psig. The results are set out in the following table. The washing procedure of Example VI was used.

TABLE 8

| Catalyst | Washing Agent | Time | g PP/g TiCl₃ | % Heptane Insolubles |
|---|---|---|---|---|
| Control | None | — | 2190 | 95.5 |
| No. 1 | 4-methyl-1-pentene | 16-20 hours | 2870 | 95.6 |
| No. 2 | 1-hexene | 16-20 hours | 3250 | 94.6 |

Again, it can be seen that washing with an olefin increases the yield of polypropylene without adversely affecting the crystallinity of the polymer.

EXAMPLE IX

All of the catalyst samples set out below were used to polymerize propylene in the case phase at 6.8 atmospheres for 1 hour at 74° C. with a butyl benzoate modified catalyst at a 7:1 ratio of diethylaluminum chloride to titanium. In experiment 1, the catalyst was not washed but in experiments 2 and 3, it was washed with liquid propylene by charging 10 grams of the catalyst into a vertical cylinder with small screens at each end to hole the catalyst in. Liquid propylene was then charged to the bottom and the top valve of the cylinder was opened slightly so that propylene could flow through the cylinder at a rate of about 22 grams per minute. After 5 minutes, the top valve was shut and the cylinder was vented through the bottom. At first, a yellowish milky solution came out on top of the liquid propylene with the evolution of some smoke. After the first minute or so, the color became clear because, it is theorized, the complex of aluminum trichloride and butyl benzoate was dissolved in the propylene or already removed.

In experiment 4, the catalyst was treated with gaseous propylene at 88 psig for 18 hours at 74° C. The catalyst gained 50% in weight and appeared swollen. In experiment 5, the catalyst treated in experiment 4 was subsequently washed with heptane. The results are set out on the following table.

TABLE 9

| Catalyst | Productivity in gms. pp/gms. TiCl₃-hr.-atmospheres | % Heptane Insolubles |
|---|---|---|
| No. 1 | 52.1 | 96.0 |
| No. 2 | 86.4 | 95.8 |
| No. 3 | 88.2 | 94.5 |
| No. 4 | 52.3 | 93.8 |
| No. 5 | 65.3 | 96.1 |

Experiments 4 and 5 above are meant to simulate the type of olefin treatment which is suggested by Defensive Publication T951,009, mentioned above. It can be seen that the process of the present invention as exemplified in experiments 2 and 3 produces much better results than the control of catalyst No. 1 and the simulated prior art treatment as shown in experiments 4 and 5. The reason why the results of experiments 4 and 5 are inferior is because the treatment was made with gaseous propylene.

EXAMPLE X

U.S. Pat. No. 3,404,096, discussed above, suggests that the productivity of the titanium trichloride catalyst can be increased by treating it with a solution of an olefin in an inert diluent. The patent states that the catalyst undergoes a physical change whereby it agglomerates into curds and appears to swell. The following experiments were performed to determine the efficacy of the process of the present invention upon a catalyst such as that described in the above patent.

In experiment 1, unmodified aluminum activated aluminum trichloride co-crystallized titanium trichloride was used to polymerize propylene under the conditions similar to that of the preceding example. In experiments 2 and 3, the same titanium trichloride was first washed with liquid propylene for 5 minutes at 25° C. and 300 psiq. The wash rate was 20 grams of propylene per minute. As the propylene contacted the titanium trichloride, a noticeable amount of heat started to build. The wash vessel walls stayed hot throughout the washing step, but the heat decreased as the washing progressed. When the washing was completed, the excess propylene was vented off. The catalyst did not swell or get sticky and there was no noticeable weight loss. In experiments 4 and 5, the same titanium trichloride was ball milled with butyl benzoate at a mole ratio of 3.8:1 and then used to polymerize propylene under the same conditions as above. The results are set out in the following table.

TABLE 10

| Catalyst | Productivity in gms. PP/gms. catalyst-hr.-atm. | % Heptane Insolubles |
|---|---|---|
| No. 1 | 25.1 | 79.9 |
| No. 2 | 26.1 | 77.0 |
| No. 3 | 23.9 | 75.0 |
| No. 4 | 36.4 | 96.7 |
| No. 5 | 37.4 | 97.2 |

It can be seen from the results of the above table, that the olefin washing method of the patent is ineffective in increasing the activity of an unmodified titanium trichloride catalyst. The percent heptane insolubles slightly decreases. In contrast, the unwashed modified catalysts exhibit much better activity and a much higher percent insolubles.

EXAMPLE XI

In this example, five different catalysts were prepared and each catalyst was divided into two portions. Catalysts 1 through 4 were independently prepared by ball milling butyl benzoate with titanium trichloride at a mole ratio of 3.8:1. Catalyst 5 was prepared by ball milling ethyl-4-chlorobutylate with titanium trichloride at a mole ratio of 3.8:1. One of the portions of each of the catalysts was washed with liquid propylene. The first four catalysts were washed according to the procedure set forth in Example IX. Catalyst 5 was treated with liquid propylene at 300 psig for 5 minutes at 25° C. The propylene wash rate was 20 grams of propylene per minute. The catalysts were weighted before and after washing. Then all of the catalysts were used to polymerize propylene according to the procedures set forth in the previous examples. The results are set forth below.

TABLE 11

| Catalyst | Washed | Gms. Polypropylene/Gms. Catalyst-hrs.-atm. | % Heptane Insoluble | % Weight Loss |
|---|---|---|---|---|
| No. 1 | No | 32.7 | 96.0 | — |
|  | Yes | 55.38 | 95.4 | 14.6 |
|  | Yes | 54.25 | 95.8 | 14.6 |
| No. 2 | No | 26.5 | 96.0 |  |
|  | Yes | 45.7 | — | 17.25 |
| No. 3 | No | 36.4 | 96.7 |  |
|  | No | 37.4 | 97.2 |  |
|  | Yes | 50.6 | 97.0 | 16.00 |
| No. 4 | No | 15.98 | 93.6 |  |
|  | No | 15.98 | 93.6 |  |
|  | Yes | 31.6 | 96.5 | — |
| No. 5 | No | 24.93 | 95.9 |  |
|  | Yes | 43.0 | 96.5 | 16.00 |

Again, it can be seen from the above results that washing these catalysts with an olefin greatly increases their productivity while maintaining the crystallinity of the polymer produced. It also can be seen from the above table, that the washing procedure of the present invention removes material from the washed catalysts, resulting in an overall weight loss. Thus, the process of the present invention is distinguished from the processes disclosed in Defensive Publication T951,009 and U.S. Pat. No. 3,404,096, discussed in detail above.

We claim:
1. A method for increasing the productivity of an olefin polymerization catalyst containing an aluminum chloride co-crystallized titanium halide modified with an electron donor containing an ester group which comprises washing the modified titanium halide with an olefin.

2. The method of claim 1 wherein the electron donor is selected from the group consisting of alkyl esters of saturated and unsaturated aliphatic and aromatic acids.

3. The method of claim 2 wherein the electron donor is selected from the group consisting of butyl benzoate, ethyl phenyl acetate, and ethyl 4-chlorobutylate.

4. The method of claim 1 wherein the washing procedure is carried out for a period of at least one minute.

5. The method of claim 4 wherein a solution is formed of an olefin in a solvent and the solution is used to wash the modified titanium halide.

6. The method of claim 4 wherein an olefin in liquid form is used to wash the catalyst with modified titanium halide.

7. The method of claim 6 wherein the modified titanium halide is placed in a container and a liquid olefin at ambient temperature and above atmospheric pressure is caused to flow through the catalyst.

* * * * *